(12) United States Patent
Zenger et al.

(10) Patent No.: US 7,833,646 B2
(45) Date of Patent: Nov. 16, 2010

(54) METHOD OF AND APPARATUS FOR DISMANTLING AND STORAGE OF OBJECTS COMPRISING ALKALI METALS, SUCH AS ALKALI METAL CONTAINING BATTERIES

(75) Inventors: Thomas Zenger, Niederstocken (CH); Andreas Krebs, Hondrich (CH); Huibert Jacobus Hendrik van Deutekom, Veldhoven (NL)

(73) Assignee: Batrec Industrie AG, Wimmis (CH)

( * ) Notice: Subject to any disclaimer, the term of this patent is extended or adjusted under 35 U.S.C. 154(b) by 1499 days.

(21) Appl. No.: 10/356,598

(22) Filed: Feb. 3, 2003

(65) Prior Publication Data
US 2003/0180604 A1 Sep. 25, 2003

(30) Foreign Application Priority Data
Feb. 1, 2002 (EP) .................. 02075460

(51) Int. Cl.
*H01M 6/50* (2006.01)
*B29B 17/00* (2006.01)
(52) U.S. Cl. ..................... 429/49; 261/37.1
(58) Field of Classification Search .......... 429/49; 264/37.1
See application file for complete search history.

(56) References Cited

U.S. PATENT DOCUMENTS

| | | | |
|---|---|---|---|
| 4,799,976 A | 1/1989 | Meyer | |
| 5,156,009 A | 10/1992 | Woodruff | |
| 5,345,033 A | 9/1994 | McLaughlin | |
| 5,601,623 A | 2/1997 | Fauteux et al. | |
| 5,789,095 A * | 8/1998 | Miyagawa et al. | 429/49 |
| 5,882,811 A | 3/1999 | Kawakami | |
| 6,329,096 B2 * | 12/2001 | Kawakami et al. | 429/49 |
| 6,524,737 B1 * | 2/2003 | Tanii et al. | 429/49 |

FOREIGN PATENT DOCUMENTS

| | | |
|---|---|---|
| DE | 4424825 A1 | 1/1996 |
| DE | 195 18 643 A1 | 11/1996 |
| EP | 0 283 412 | 9/1988 |
| EP | 0 618 633 A1 | 10/1994 |
| EP | 0 794 587 A2 | 9/1997 |
| EP | 0 895 295 A1 | 2/1999 |
| JP | 59-128760 | 7/1984 |
| JP | 9-63649 | 3/1997 |
| JP | 2000-231938 | 8/2000 |
| WO | WO 01/08245 A1 * | 2/2001 |

* cited by examiner

*Primary Examiner*—Patrick Ryan
*Assistant Examiner*—Karie O'Neill Apicella
(74) *Attorney, Agent, or Firm*—Oblon, Spivak, McClelland, Maier & Neustadt, L.L.P.

(57) ABSTRACT

There is disclosed a method of and an arrangement for dismantling and storage of objects comprising alkali metal containing substances, in particular lithium containing batteries, in the presence of a protective atmosphere, wherein the protective atmosphere is carbon dioxide. The arrangement comprises a gas-tight chamber for bringing the objects under a protective environment, and a gas-tight chamber for dismantling the objects within the protective atmosphere of carbon dioxide gas.

21 Claims, 4 Drawing Sheets

METHOD OF AND APPARATUS FOR DISMANTLING AND STORAGE OF OBJECTS COMPRISING ALKALI METALS, SUCH AS ALKALI METAL CONTAINING BATTERIES

Method of and apparatus for dismantling and storage of objects comprising alkali metals, such as alkali metal containing batteries.

FIELD OF THE INVENTION

The present invention relates generally to the handling of alkali metals or alkali metal compounds and more specifically, to the handling of lithium containing cells or batteries of all existing industrial classes.

BACKGROUND OF THE INVENTION

The group of alkali metals comprises chemical elements that can be found in the first group of the periodic table of elements, and is known for its strong exothermic chemical reactivity. It is exactly this reactivity that makes handling of these alkali metals, such as crushing, shredding and other mechanical processing steps, a challenging and risky procedure.

In practice, the alkali metals, which comprise lithium, sodium, potassium, rubidium, caesium and francium, are handled within a protective environment chosen to suppress or control the reaction of the alkali metals with any other substance, such as water, acids and nonmetals. The reactivity of the alkali metals increases from lithium to francium and as pure elements they are usually stored in oil for safety. Examples of handling procedures as described above, can be found within the lithium battery recycling industry.

With atomic number 3, lithium is the first element in group 1 of the periodic table. Lithium metal reacts very readily with many compounds, generating large quantities of energy and often involving fires and explosions. Lithium especially reacts explosively with any water or water vapour available, generating hydrogen gas, which itself is highly explosive.

Batteries are the main power source for a wide variety of electric and electronic equipment. As batteries contain a large array of different chemical and metallurgical substances, the collection of waste batteries for recycling is ever increasing. For many types of these batteries well established recycling technologies are in operation.

Portable lithium batteries are ever more used in consumer, military and professional applications. Collection and recycling of these batteries pose special problems and require dedicated and professional attention to prevent accidents in the logistic chain from the user until the recycling facility, and during the recycling process itself. The types of hazardous and polluting chemical substances which are liberated during the recycling process need special attention too.

Given the chemical properties of lithium, the main recycling technology for portable lithium batteries is very complicated and expensive because of the use of cryogenic technologies in an extremely low temperature environment of liquid nitrogen. Further, cryogenic processes itself may use quite hazardous materials.

Cryogenic recycling processes have been described in U.S. Pat. No. 5,888,463 and U.S. Pat. No. 5,345,033, where the batteries are cooled down to low temperatures after which they are comminuted and the contents are neutralized.

Another known technology is the use of a protective environment of inert gases like helium, argon, krypton, xenon or neon (alternatively even nitrogen is used), as is described in European patent application 613,198. In addition, European patent application EP 1,041,659, mentions the use of a non-oxidizing atmosphere.

These complicated and expensive technologies pay respect to the high reactivity of lithium metal, and the hazardous nature of many of the substances used as electrolytic and cathodic material in these batteries, by directly suppressing an exothermic reaction by means of reducing the internal energy (cryogenic processes) or preventing contact between lithium and its reaction components.

Another disadvantage of the abovementioned dismantling processes, is that they are all very polluting, each in their own way. Note that cryogenic processes consume a lot of energy, and the use of inert gasses requires the first of all purification of these inert gasses which is as well very energy consuming (this again often requires cryogenic processes).

In addition, although these processes provide a means of dismantling the substances, these substances are to be collected first in order to make the process more cost effective. The transportation and storage of these substances provides, in turn, an environmental hazard and requires a lot of preparations.

SUMMARY OF THE INVENTION

It is an object of the present invention to provide a novel and cost effective alternative to the existing methods of dismantling batteries or cells comprising alkali metals, in particular lithium.

It is in particular an object of the present invention to provide a novel and cost effective method for dismantling portable lithium cells or batteries of all existing industrial classes using well established dismantling techniques, such as crushing, shredding or other mechanical processing techniques.

It is a further object of the present invention to provide such a method that after dismantling of the cells or batteries, the chemical substances present in the batteries can easily be separated from the metal scraps and can be recovered and/or prepared for non-hazardous and non-polluting disposal.

It is yet another object of the present invention to protect the environment against pollution by the chemical substances from lithium batteries, liberated during the dismantling operation, which comprise numerous highly toxic materials and compounds, such as sulfur dioxide and thionylchloride, as well as strong complexing agents as boriumtetrafluorides and arsenichexafluorides.

A further object of the invention is to provide a safe and environmental friendly method and means for storing and transporting said batteries and cells.

In a first aspect according to the present invention there is provided a method for dismantling batteries or cells comprising alkali metal containing substances, in particular lithium containing batteries or cells, in the presence of a protective atmosphere, characterized in that said protective atmosphere is a carbon dioxide atmosphere.

It has been observed that the carbon dioxide atmosphere enables the dismantling of alkali metal containing substances, such as lithium batteries for example, without uncontrollable exothermic reactions and such that the cells or batteries can be dismantled in a safe and clean manner under a protective atmosphere or environment formed by carbon dioxide.

From an (electro)chemical point of view, it is quite surprising that apparently the lithium present in the batteries reacts more readily with the carbon dioxide by building a passive surface layer, than to react vigorously with the cathode material present in the batteries. During the dismantling operation, such as a shredding operation, the cathode material surfaces and the lithium metal surfaces will be rubbed through and against each other very intensively, and not withstanding this intense rubbing and smearing, the building of a passive layer on the lithium metal seems to be the prime reaction.

It should be noted here that the use of carbon dioxide in the presence of lithium, amongst others in methods for dismantling cells or batteries, is discouraged in the industry. Reference is made to the afore-mentioned document U.S. Pat. No. 5,345,033 as well as numerous safety regulations. However, the use of protective atmospheres comprising carbon dioxide during manufacturing of lithium cells or batteries is known, such as described in EP 0 895 295 which discloses a method of manufacturing a non-aqueous secondary battery comprising lithium containing electrodes, wherein cutting of the electrodes and sticking of metal foils is carried out in a protective atmosphere comprising air or argon, preferably in combination with carbon dioxide. Note that manufacturing of these batteries occurs in a controlled environment, wherein the substances used for processing and the effects of the atmosphere on these substances is predictable. This is however not the case in dismantling processes, where the dismantling of various kinds of alkali metal containing batteries may yield an unpredictable mix of substances (for instance in a shredder), giving rise to unpredictable chemical and physical interactions with a protective atmosphere.

It has further been observed that the method according to the invention is very promising from a commercial point of view, due to the avoidance of complicated and expensive technologies, for the reason that the method essentially can be applied at room temperature, i.e. 293 K.

In addition to the carbon dioxide, the protective atmosphere may comprise at least one further gaseous substance, such as moist air or carbon monoxide. Although a reaction between lithium and water vapour is more exothermic than a reaction with carbon dioxide, this reaction can easily be controlled in presence of carbon dioxide. Water vapour eventually neutralises the lithium, enabling the further handling of the scrap of the dismantled cells or batteries.

If required, the at least one further gaseous substance may comprise an inert gas, including nitrogen.

In practice, the at least one further gaseous substance is added to the protective atmosphere during the handling of the objects, and may continuously or with given intervals be refreshed during the handling or storage of the objects.

In a further processing step, after dismantling of cells or batteries, such as lithium cells or batteries, the residual scrap of the cells or batteries may be washed or leached, for example using an acidified aqueous liquid. This step may be enhanced by thermal treatment of the scrap, such as pyrolysis, in order to improve the removal of substances like, for example, plastics. Further, mechanical means, such as sieving, tumbling, size grading or any other known sorting technique, to separate metal fractions from the scrap may also be used.

Any residual products of the washing or leaching, such as residual leaching or washing liquid, may be processed in order to recycle valuable chemical substances present in the residue.

In a further embodiment of the invention, the method comprises prior to said dismantling, a step of storing the batteries or cells under the protective atmosphere using storage means. Another preferred embodiment of the invention comprises a step of transporting said batteries or cells in storage means under said protective atmosphere.

Note that a step of collecting the batteries and storing cells or batteries in the protective atmosphere, incredibly increases cost efficiency and flexibility, and makes the method more environmental friendly due to economy of scale. The invention also provides a means for performing the steps of transportation as well as storage, enabling the collection of cells and batteries, using the same novel and inventive concept of using a protective atmosphere as described herein-above.

In a second aspect, the invention provides an arrangement for dismantling batteries or cells comprising alkali metal containing substances, in particular lithium containing batteries or cells, comprising a first gas-tight chamber, having an inlet for adding gasses to said first gas-tight chamber and an outlet for removing gasses from said first gas-tight chamber, a second gas-tight chamber having an inlet for adding gasses to said second gas-tight chamber and an outlet for removing gasses from said second gas-tight chamber, said second gas-tight chamber comprising means for mechanically dismantling said batteries or cells, said first gas-tight chamber having a gas-tight door for receiving said objects, said second gas-tight chamber having a gas-tight door for removing dismantled batteries or cells, and said first gas-tight chamber and said second gas-tight chamber connect by a gas-tight door for exchanging batteries or cells to be dismantled, wherein said first and said second gas-tight chamber and said in- and outlets are arranged for providing a carbon dioxide atmosphere in said chambers.

For applying the several embodiments of the method according to the present invention, the outlets of the gas-tight chambers are arranged for adding at least one further gaseous substance in addition to the carbon dioxide atmosphere, and for refreshing the atmosphere during the processing of the objects.

In a yet further embodiment of the arrangement according to the present invention, in addition to the gas-tight chambers, a reactor room for collecting and washing of the processed objects with an acidified aqueous liquid is provided, the reactor connecting to the gas-tight door for removing the processed objects from the second gas-tight chamber.

Note that another embodiment of the invention provides storage means to the arrangement, arranged for storing the batteries and cells under a protective atmosphere, in accordance with the respective embodiment of the first aspect of the invention.

In a third aspect, the present invention provides an arrangement for the storage of objects comprising alkali metal containing substances, in particular lithium containing batteries, comprising a gas-tight chamber in which said objects can be stored, which gas-tight chamber is separated from its surrounding environment by an air lock, and comprising an inlet and an outlet for adding and removing gasses from said gas-tight chamber, wherein said gas-tight chamber and said in- and outlets are arranged for maintaining a carbon dioxide atmosphere in said chamber.

In a fourth aspect, the present invention provides an arrangement for the storage of batteries or cells comprising alkali metal containing substances, in particular lithium containing batteries or cells, comprising a chamber in which said batteries or cells can be stored, wherein said chamber comprises means for filling said chamber with a substance, wherein said means for filling said chamber are arranged for providing a carbon dioxide atmosphere in said chamber.

In a fifth aspect of the invention, there is provided a vehicle arranged for transportation of batteries or cells comprising alkali metal containing substances, in particular lithium containing batteries or cells, comprising a chamber in which said batteries or cells can be stored, wherein said chamber comprises means for filling said chamber with a substance, wherein said means for filling said chamber are arranged for providing a carbon dioxide atmosphere in said chamber.

Note that a vehicle according to said fifth aspect of the invention is capable of performing most of the steps required for collection of the batteries or cells to be dismantled, and is able to perform these steps in an environmental friendly manner.

The present invention will now be further elucidated by a description and drawings referring to a preferred embodiment thereof, directed to the dismantling of lithium containing cells or batteries. The invention is not limited to the embodiment and experiments disclosed, which are provided for explanatory purposes.

DETAILED DESCRIPTION OF THE INVENTION

Figure 1:
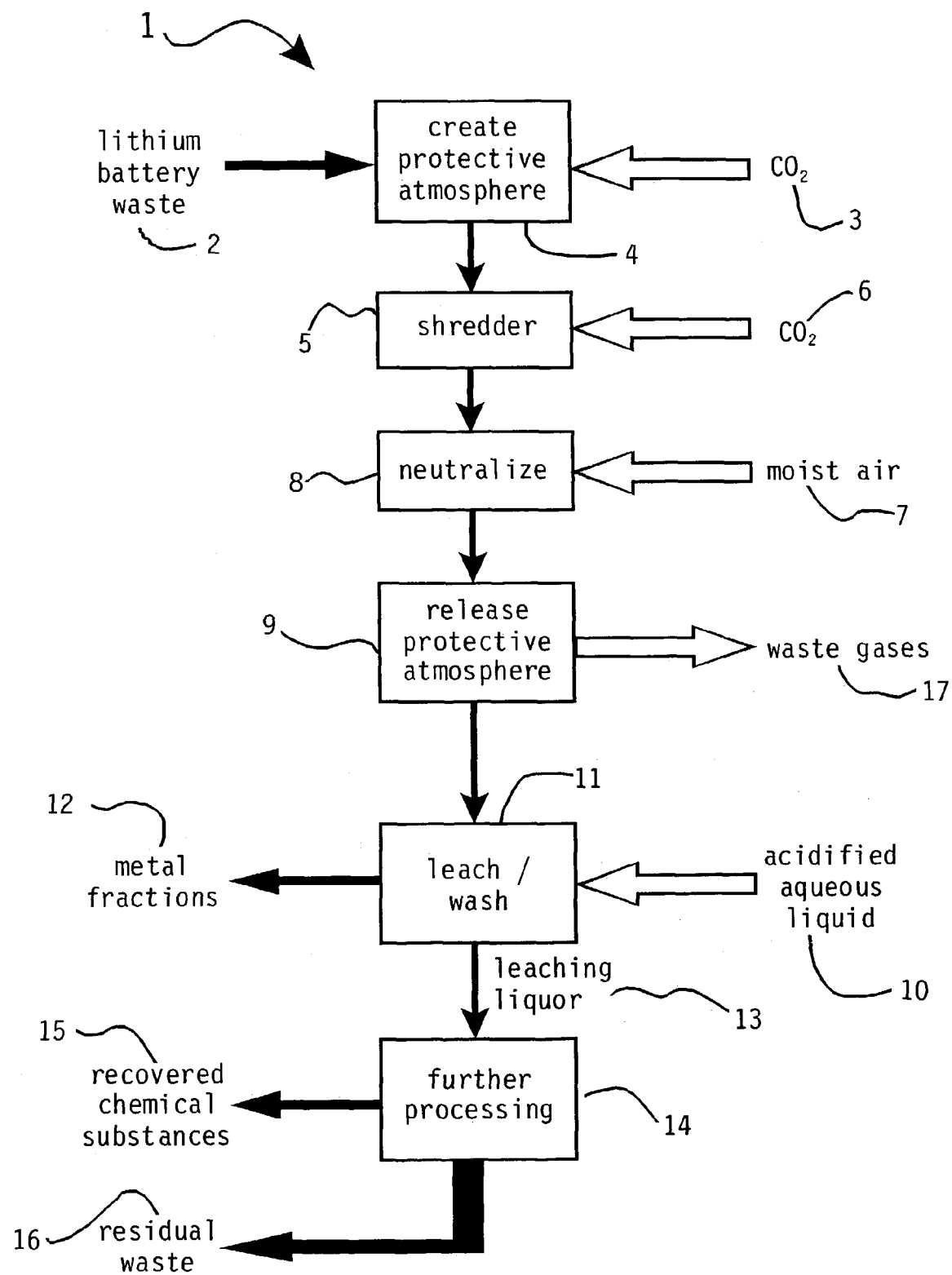
FIG. 1 shows a flow chart type diagram illustrating the method according to the present invention.

FIG. 1 illustrates in a flow chart type manner a method according to an embodiment of the invention, generally designated by reference numeral 1.

In a first step, lithium battery waste 2 is received in a protective environment or atmosphere 4 formed by carbon dioxide gas ($CO_2$) 3.

In a second step, the waste material 2 is dismantled under the gaseous carbon dioxide protective atmosphere 4 using a mechanical processing technique such as shredding 5, while the carbon dioxide gas 6 is constantly refreshed.

The carbon dioxide atmosphere 4 enables shredding of the battery waste 2 without strong exothermic reactions. The lithium metal seems to react more readily with the carbon dioxide, building a passive surface layer, than to react vigorously with the cathode material present in the cells or batteries. This although lithium metal surfaces and cathode material in the battery scrap are rubbed through and against each other intensively in the shredder 5.

Instead of shredding the battery waste 2, a large number of alternative techniques can be used to dismantle the batteries, such as cutting, pressuring, deforming, separating, breaking or a large number of mechanical deformation techniques, either alone or in combination.

After dismantling the battery waste 2, in the preferred embodiment shown, moist air 7 is added to the carbon dioxide atmosphere 4, in order to neutralize 8 the scrap material resulting from the shredding operation 5. Then, when all metal scrap is neutralized, the protective atmosphere is released 9 by removing any residual gases 17.

After this, the neutralized metal scrap is leached and washed 11 with an acidified aqueous liquid 10. As a result of the leaching process 11, metal fractions 12 can be separated safely from the leaching liquor 13 that contains soluble chemical substances.

In washing and leaching experiments with neutralized battery scrap, it has been observed that almost all of the metal fractions can be recovered using this process. This may be enhanced by thermal treatment of the scrap, such as pyrolysis, as this improves the removal of substances like, for example, plastics. Further, mechanical means (not shown in the figures), such as sieving, tumbling, size grading or any other known sorting technique, to separate metal fractions from the scrap may also be used.

After the metal fractions 12 are removed the leaching liquor can be processed in step 14 as to recover a number of the chemical substances 15 and to safely and cleanly dispose of the residual waste 16.

Figure 2:
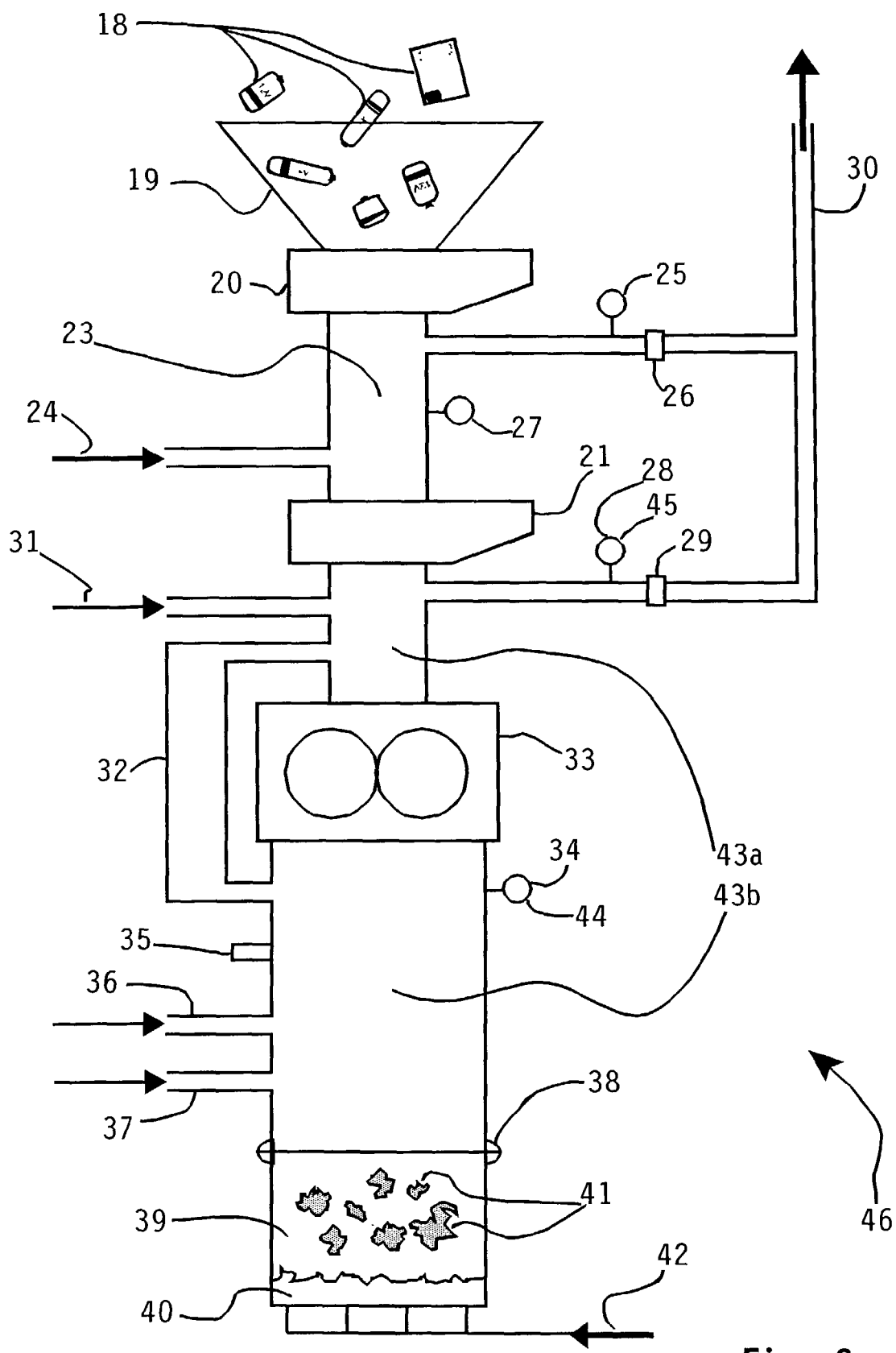
FIG. 2 shows, in a schematic and illustrative manner, an arrangement for dismantling cells or batteries in accordance with the present invention.

In FIG. 2 an arrangement 46 is shown, for performing the above-disclosed dismantling of cells or batteries, in accordance with the present invention.

The arrangement comprises a first gas-tight chamber 23 and a second gas-tight chamber 43a,b, which connect by an intermediate gas-tight door 21. The first gas-tight chamber 23 connects by a gas-tight door 20 to a funnel shaped supply port 19, for receiving battery waste 18. The second gas-tight chamber 43a,b connects by a gas-tight coupling or a door 38 to a reactor room 39.

The first chamber 23 comprises a gas inlet port 24 and a gas outlet port 30. The second chamber 43a,b comprises means for dismantling the battery waste, such as a shredder 33, which divides the chamber in an upper part 43a and a lower part 43b. The upper part 43a of the second chamber, situated between the shredder 33 and the intermediate gas-tight door 21, comprises an inlet port 31 for fire fighting safety purposes and connects also to the gas outlet port 30. The lower part 43b of the second chamber, situated between the shredder 33 and the reactor room 39 comprises a gas inlet port 36 and an inlet port 37 for fire fighting safety purposes. Both parts 43a and 43b of the second chamber connect by gas overflow pipe 32.

The gas outlet port 30 connects to the first and second chambers 23, 43a,b by one-way valves 26 and 29, respectively. The atmosphere inside the first chamber 23 can be monitored by barometer means 27 and an oxygen measuring device 25. The gas pressure inside chamber 23 can be controlled by the one-way valve 26. The atmosphere inside the second chamber 43a,b can be monitored by barometer means 34, temperature measurement means 44, a flame detector 35, oxygen measuring means 28 and a hydrogen measuring device 45. Although not explicitly shown, those skilled in the art will appreciate that the gas supply via the inlet ports 24 and 36 can be likewise controlled by one-way valves. In practice the monitoring and control means 25, 26, 27, 28, 29, 34, 44 and 45 as well as the operation of the doors 20, 21 are processor controlled (not shown).

In accordance with the present invention, the first and second chambers 23, 43a,b, the inlet and outlet ports 24, 31, 36 and 30, the overflow pipe 32, the doors 20, 21 and 38, the shredder 33 as well as the monitoring, control and valve means 25, 26, 27, 28, 29, 34, 44 and 45 are arranged for providing a carbon dioxide atmosphere or environment in the arrangement 46.

In operation, battery waste 18 is supplied to the first chamber 23 via the supply funnel 19 and the gas-tight door 20. After closing off the door 20, the waste 18 in the first chamber 23 is brought under a protective atmosphere by adding carbon dioxide via the inlet port 24, while the intermediate gas-tight port 21 is closed. The atmosphere inside the first chamber 23 is monitored via the barometer means 27 and the oxygen measuring device 25. The pressure inside the first chamber 23 is controlled by the one-way valve 26 to the outlet 30.

After the battery waste 18 has been brought under the protective atmosphere, the intermediate gas-tight port 21 is opened and the waste 18 will pass, through upper part 43b, to the shredder 33 in the second chamber, under the force of gravity.

It will be appreciated that the shredder 33 may be replaced by any device for dismantling cells or batteries, such as a cutting device, a pressuring device, a deformation device, a separation device, a breaking device or any other device for mechanically processing the waste.

The atmosphere within the second chamber 43a,b and the shredder 33 is controlled by providing carbon dioxide gas through the inlet port 36, gas overflow pipe 32 and one-way valve 29 to outlet 30. The atmosphere can be monitored by the barometer means 34, the temperature measuring means 44, the flame detector 35, the oxygen measuring device 28 and the hydrogen measuring device 45. For safety reasons, possible fire within shredder 33 can be controlled by the fire fighting devices 31 and 37.

After the shredder operation 33, the residual battery scrap 41 from the shredder 33 will fall into the lower part 43b of second chamber 43. Here, according to the preferred embodiment of the present invention as shown, neutralizing of the battery scrap 41 will take place. During this phase of the process, besides supplying $CO_2$ gas via the inlet port 36, other gaseous substances such as moist air and inert gasses can be introduced into second chamber 43 via the inlet port 36.

After shredding and neutralizing the battery scrap 41, under the condition that oxygen and hydrogen levels are safe, the scrap 41 is removed by opening of the door or coupling 38 to the reactor room 39. The reactor room 39, which receives the (mostly neutralized) battery scrap 41, may comprise a bed of dry ice 40 and is air conditioned by an air conditioning system 42.

Outside the protective atmosphere, the abovementioned battery scrap 41 can be leached and washed in an acidified aqueous liquid, for example, to recover the metal fractions. This may be enhanced by thermal treatment of the scrap (not shown), such as pyrolysis, as this improves the removal of substances like, for example, plastics. Further, mechanical means (not shown in the figures), such as sieving, tumbling, size grading or any other known sorting technique, to separate metal fractions from the scrap may also be used. After this, the residue of the washing process can be processed even further, to recover as much as possible chemical substances, thereby avoiding as much as possible pollution of the environment.

The invention will be further clarified by reference to a number of experiments for dismantling lithium cells or batteries, carried out with the arrangement 46, disclosed above.

Portable lithium batteries can be classified into three main classes. These classes are based upon the electrochemistry, the application fields, and the hazards involved in the processing of the lithium batteries, and between which there is a clear relationship.

The three main classes or types of portable lithium batteries are:
consumer type,
professional type, and
lithium ion type batteries.

The class of professional type batteries may further be subdivided into two sub-classes:
lithium-thionyl chloride (professional type A), and
lithium-sulfur dioxide (professional type B).

The electrolyte of the first of the two professional type batteries, i.e the lithium-thionyl chloride type, has a boiling point well above room temperature. The electrolyte of the second type, i.e. the lithium-sulfur dioxide type, is gaseous at room temperature.

Note that these two sub-types are characterized by the main type of electrolyte (thionyl chloride and sulfur dioxide). Especially the thionyl chloride group consists of a large number of further electrolytes, which behave physically in more or less the same way. Further the thionyl chloride types are the main representative, whilst the others only being of minor importance from a users point of view.

Further, it is noted that especially the professional type batteries are mainly used as multi-cell batteries, packed together, using several types of plastic containers and tapes. The present invention also applies to the dismantling of these packs.

During the development phase of the present invention, a number of experiments have been carried out to study the processing of lithium batteries in a protective environment comprising carbon dioxide.

The first set of experiments has been executed to investigate the behaviour of the main classes of lithium batteries. During these experiments, different amounts of the various types of batteries have been processed. In one of these experiments, 5 kg of the most hazardous type of lithium batteries to dismantle, i.e. the professional type B (containing sulfur dioxide), has been washed with 0.5 $m^3$/hour carbon dioxide gas whilst processing in the shredder 33. During the shredder operation the temperature of the mass did not exceed 297 K.

After 15 minutes the operation was stopped and the reactor room 39 was opened. Upon opening of the reactor, the temperature of the mass rapidly increased but did not exceed 353 K, which is an acceptable temperature. The mass was discharged after 2 hours, at a temperature of 298 K.

During this first set of experiments it was observed that 5 kg of each type of battery could safely be dismantled using a carbon dioxide wash of 0.5 $m^3$/hour for various durations (all less than one hour).

In a further experiment 20 kg of a mixture of all types of portable lithium type batteries including added impurities (simulating a more realistic process) has been dismantled while it was washed with carbon dioxide gas. The amount of carbon dioxide varied between 0.5 $m^3$/hour and 1 $m^3$/hour during the experiment. The duration of the washing and shredder operation amount in total 215 minutes and the temperature did not exceed 403 K. After opening of the reactor and discharging the mass, the temperature did not exceed 313 K.

In another experiment, using as well as 20 kg of a mixture of all types of portable lithium type batteries, including added impurities, different amounts of carbon dioxide gas, varying between 1 $m^3$/hour and 4 $m^3$/hour, were used during the dismantling operation. In addition to the carbon dioxide, with intervals, up to 1 $m^3$/hour moist air was added. The dismantling operation was stopped after 330 minutes. During the experiment, the temperature did not exceed 351 K. Directly after opening of the reactor, the temperature increased rapidly, but did not exceed 423 K. The experiment showed that the temperature during the dismantling operation can be excellently controlled by using a carbon dioxide gas wash, in combination with moist air.

Samples from the mass that was taken from this last experiment have been leached and washed with acidified aqueous liquid and analysed in order to determine how well the metal fractions can be separated from the scrap. It was concluded from these last experiments that approximately 80% of the metal fractions can be retrieved from the scrap if the washing is performed with dedicated mechanical agitation. The washing liquid can be further processed, for recovering further chemical substances, if required.

Specifically, given the behaviour of lithium in carbon dioxide as observed in the above experiments, one skilled in the art will appreciate the use of carbon dioxide in storage facilities for objects that contain lithium or other alkali metals that may for instance be used to hold batteries and cells to be dismantled, until the step of dismantling can be performed.

Accordingly, the invention relates to an arrangement such as a storage container or the like, comprising a gas-tight chamber in which the objects can be stored, which gas-tight chamber is separated from its surrounding environment by an air lock. The chamber having an inlet and an outlet arranged for maintaining a carbon dioxide atmosphere in the chamber.

In a yet further embodiment, the invention provides an arrangement for safely storing objects comprising alkali metal containing substances, in particular lithium containing batteries, in a chamber comprising means for filling the chamber with a substance in case of an emergency, such as a fire, wherein the means for filling the chamber are arranged for providing a carbon dioxide atmosphere in the chamber.

Note that the above embodiments may also be comprised in the arrangement of FIG. 2.

Figure 3:
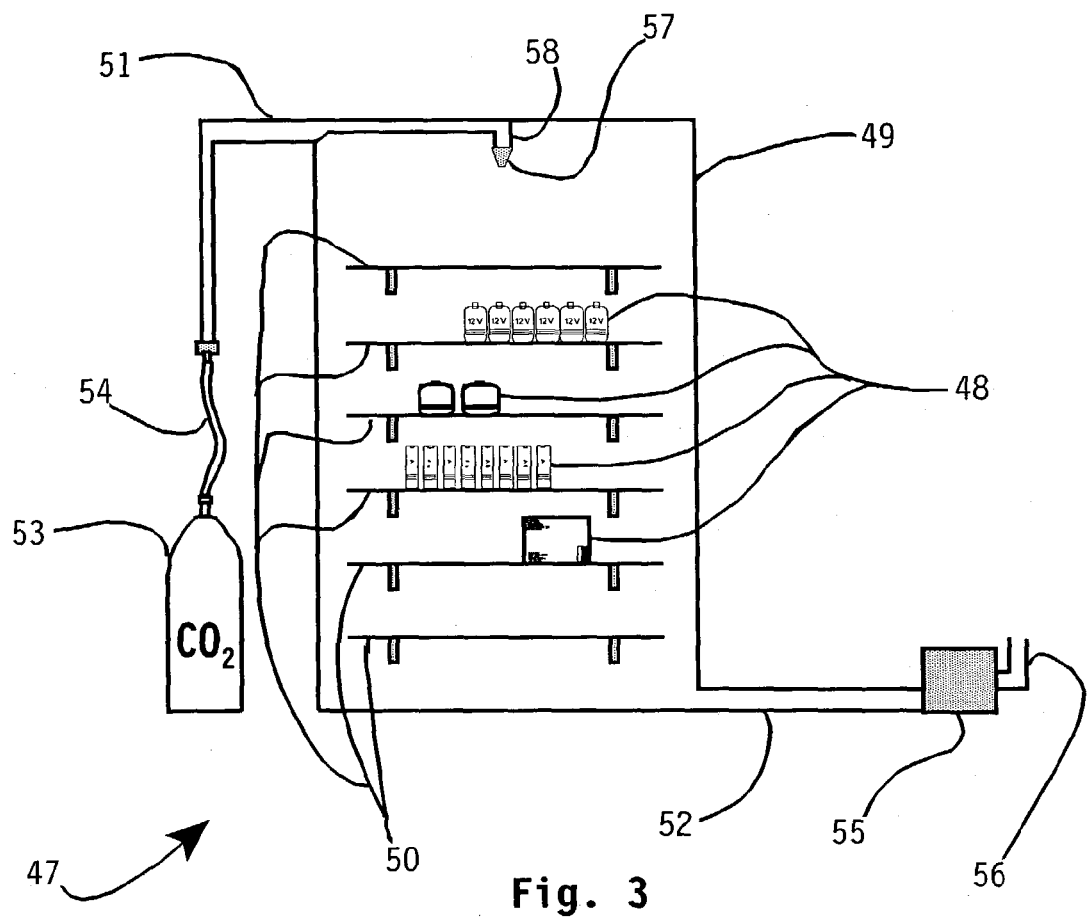
FIG. 3 shows a cross section of a storage container for the storage of alkali metal containing substances, such as lithium containing batteries.

FIG. 3 shows another preferred embodiment of the invention. In this figure an arrangement 47 of a gas-tight container 49 for the storage of alkali metal containing objects, such as lithium batteries 48, is equipped with means 51, 53, 54, 57 and 58 for filling the container with carbon dioxide and a suction arrangement 52, 55 and 56 for removing gases from the atmosphere in container 49.

The gas-tight container 49 comprises shelves 50 onto which batteries 48 may be stacked. It further comprises an inlet 51 connected to a carbon dioxide bottle 53 by a hose 54, which inlet 51 connects to a tube 58 inside the container 49, which tube 58 ends in a nozzle 57 for spreading carbon dioxide throughout the container 49. At the bottom of the container 49, an outlet 52 is connected to a suction unit 55 which comprises an outlet 56. It will be appreciated that the container will also comprise a door or lid (not shown) for placing the batteries in the container.

Figure 4:
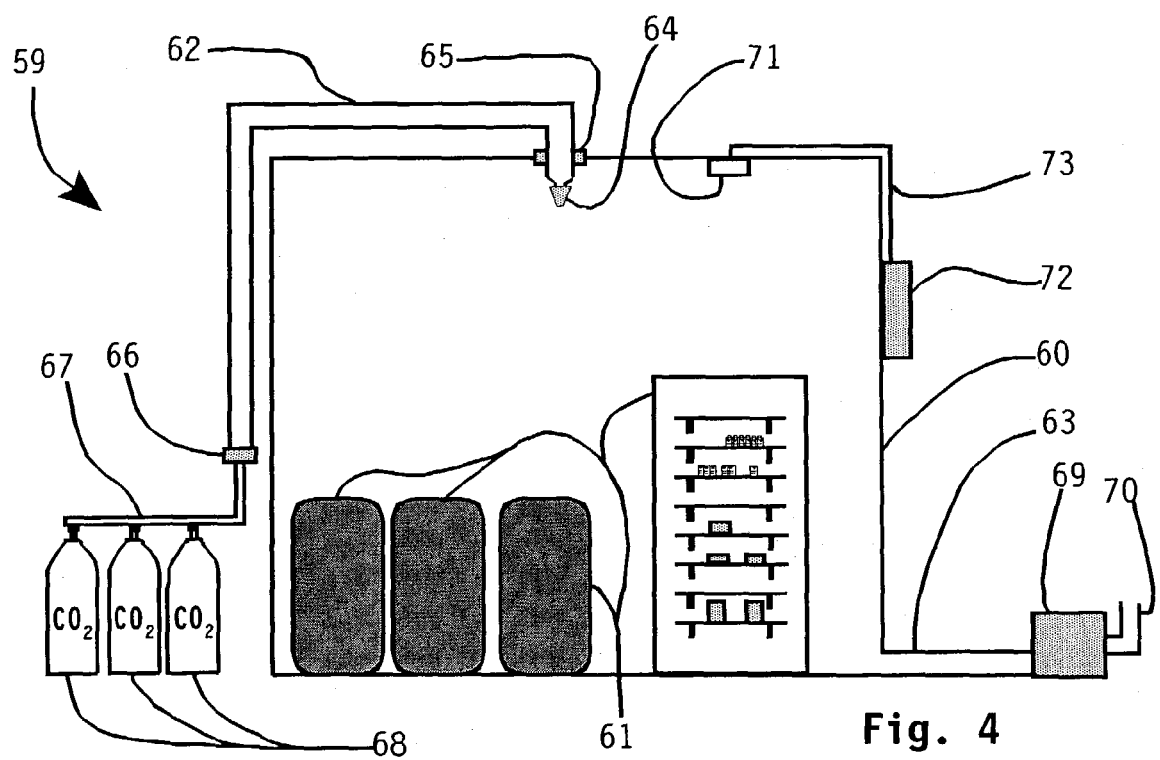
FIG. 4 shows a storage facility or bunker, equipped with means for filling the facility with carbon dioxide in case of an emergency.

FIG. 4 shows a cross section of a storage facility 59. The storage facility comprises a storage chamber 60, in which containers 61 filled with alkali metal containing substances or objects may be stored, an inlet 62 through which carbon dioxide may be added in case of an emergency, and an outlet 63 connected to a suction unit 69 with outlet 70. Inlet 62 enters the room via coupling 65 and is connected to a nozzle 64 for quickly filling the storage chamber 60 with carbon dioxide. On the other end, inlet 62 is connected to a number of carbon dioxide bottles 68 by an automatic valve 66 and tubes 67. The facility 59 further comprises a detection unit 71 for detecting smoke, fire or heat development inside chamber 60. The detection unit 71 is connected 73 to an electronic device 72 which, in the case of an emergency inside the chamber 60, triggers both valve 66 to open and suction unit 69 to start operating. The chamber 60 will as such be brought under a protective environment in which the stored substances and objects 61 may quietly react until they are neutralized.

A similar arrangement as is shown in FIG. 4 may be arranged for transportation by means of a vehicle. This provides a means for collecting batteries or cells to be dismantled. Note that collecting batteries and cells enables a method of the present invention to be carried out on a larger scale, providing environmental benefits and cost efficiency.

Figure 5:
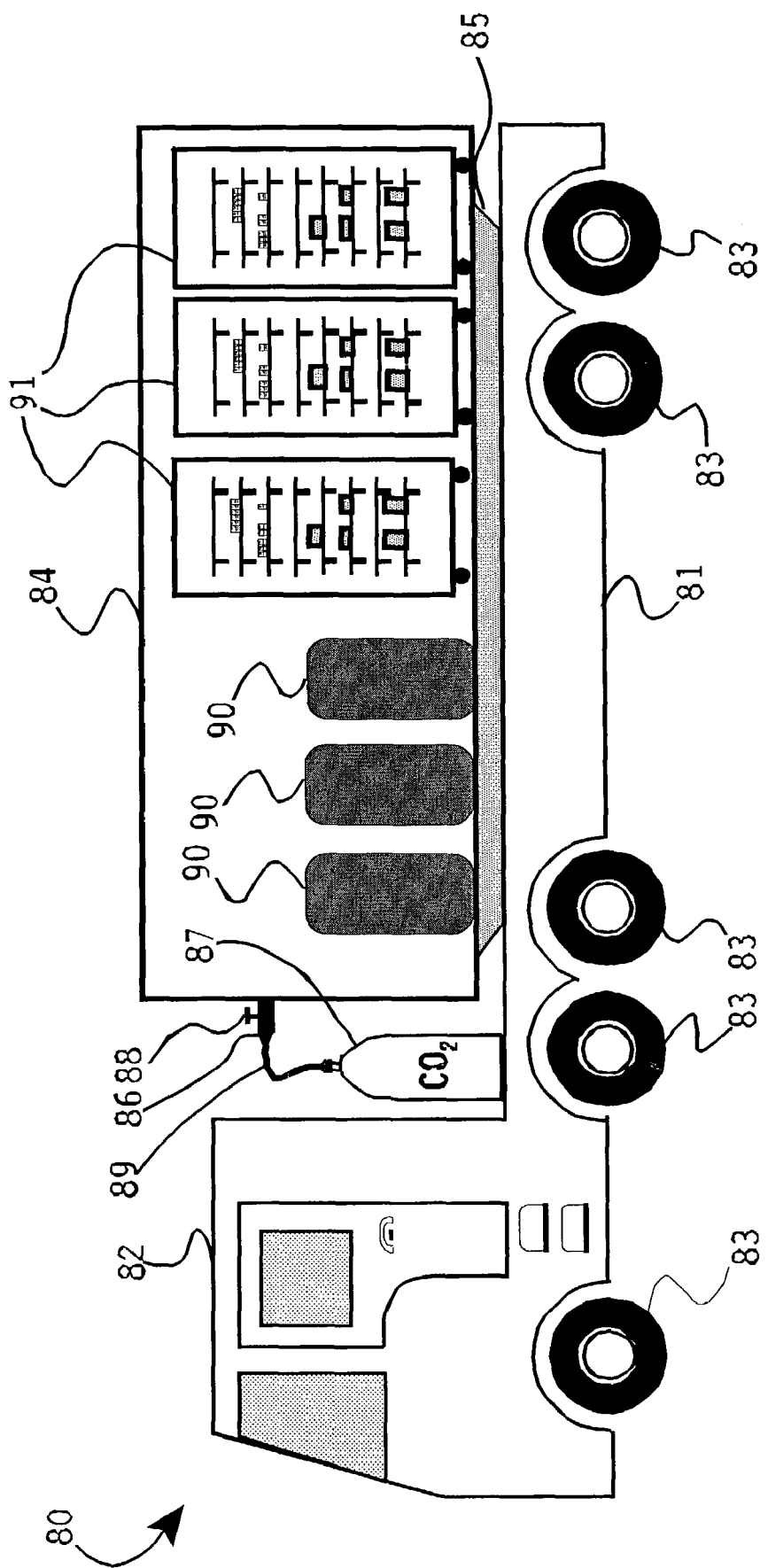
FIG. 5 shows a vehicle arranged for transportation of batteries or cells under a protective carbon dioxide environment, according to the present invention.

An arrangement as described above is, for instance, shown in FIG. 5, which illustrates a vehicle (generally indicated as 80), comprising a chassis 81, which chassis 81 comprises a cabin 82 and wheels 83. The vehicle is arranged for carrying a storage means or storage container 84, which storage container 84 comprises means 85 for placing or hauling said container 84 onto said vehicle 80. Said means 85 may comprise a rail for instance.

The container 84 may be air-tight and comprises inlet means 86 which are connected to a repository of carbon dioxide, such as gas bottle 87, for providing a protective atmosphere in said container. Said inlet means may comprise a (automatic or manual) valve 88 and is connected to said gas bottle 87 by means of a hose 89. Note that in case said valve is an automatic valve, this may be controlled from inside the cabin 82 of the vehicle. Said container is arranged for comprising alkali metal containing batteries or cells or likewise objects, such as barrels 90 which comprise lithium containing batteries or movable containers 91 comprising the same.

Use of the invention is not limited to the handling of lithium batteries. As has been mentioned above, the novel and inventive method and arrangement can be applied to the treatment of any alkali metal containing substance or object that containing such substances.

For the purpose of comprehensiveness it is noted here that numerous modifications and variations of the present invention are possible in the light of the above teachings, without applying any inventive skills. It is therefore understood that within the scope of the appended claims, the invention may be practised otherwise than as specifically described herein.

The invention claimed is:

1. A method for dismantling a battery or cell comprising alkali metal containing substances, said method comprising subjecting the whole battery or cell to a mechanical deformation process in the presence of a protective atmosphere comprising carbon dioxide which is reactive with said alkali metal containing substances, wherein said mechanical deformation process yields an unpredictable mix of substances, and wherein surfaces of said alkali metal containing substances and cathode material present in said battery or cell contact each other during said mechanical deformation process.

2. A method according to claim 1, wherein said protective atmosphere is substantially gaseous.

3. A method according to claim 1 or claim 2, wherein, in addition to said carbon dioxide, said protective atmosphere comprises at least one further gaseous substance.

4. A method according to claim 3, wherein said at least one gaseous substance is added to said protective atmosphere during said mechanical deformation process.

5. A method according to claim 1, wherein said protective atmosphere is refreshed during said mechanical deformation process.

6. A method according to claim 1, wherein prior to said dismantling, said method further comprises a step of storing said batteries or cells under said protective atmosphere.

7. A method according to claim 1, further comprising a step of transporting said batteries or cells under said protective atmosphere.

8. A method according to claim 1, wherein said mechanical deformation process comprises at least one of shredding, cutting, pressuring, deforming, separating, or breaking providing residual scrap.

9. A method according to claim 1, wherein after said dismantling of said cells or batteries, residual scrap of said cells or batteries is neutralized.

10. A method according to claim 9, wherein said neutralization of said scrap is carried out by adding moist air to said protective atmosphere.

11. A method according to any of claim 9 or 10, wherein after said neutralization of said scrap of said cells or batteries, said scrap is washed or leached.

12. A method according to claim 11, wherein said washing is carried out with an acidified aqueous liquid.

13. A method according to claim 11, wherein residual products of said washing or leaching are processed in order to recycle valuable chemical substances present in said residue.

14. A method according to claim 12, wherein residual products of said washing or leaching are processed in order to recycle valuable chemical substances present in said residue.

15. A method for dismantling batteries or cells comprising alkali metal containing substances as claimed in claim 1, wherein said batteries and cells are lithium containing batteries and cells.

16. A method according to claim 1 or claim 2, wherein, in addition to said carbon dioxide, said protective atmosphere comprises at least one further gaseous substance selected from the group consisting of inert gas, moist air, nitrogen, and carbon monoxide.

17. A method according to claim 1, wherein said mechanical deformation process comprises shredding.

18. A method according to claim 13, wherein said residual products of said washing or leaching are residual leaching and washing liquid.

19. A method according to claim 14, wherein said residual products of said washing or leaching are residual leaching and washing liquid.

20. A method according to claim 15, wherein said mechanical deformation process is performed on a battery.

21. A method according to claim 15, wherein said mechanical deformation process is performed on a cell.

* * * * *